United States Patent [19]

Marks et al.

[11] Patent Number: 4,720,510

[45] Date of Patent: Jan. 19, 1988

[54] PROCESS FOR PRODUCING PHENOLIC FOAMS

[75] Inventors: Gerald C. Marks, Cardiff; Kenneth C. Thomas, Wenvoe, both of Wales; Per I. Quist, Astorp, Sweden

[73] Assignee: BP Chemicals Limited, London, England

[21] Appl. No.: 736,551

[22] Filed: May 21, 1985

[30] Foreign Application Priority Data

May 25, 1984 [GB] United Kingdom ............... 8413529
May 30, 1984 [GB] United Kingdom ............... 8413789

[51] Int. Cl.$^4$ ................................................. C08J 9/14
[52] U.S. Cl. ........................................ 521/114; 521/82; 521/88; 521/98; 521/117; 521/131; 521/181
[58] Field of Search ................. 521/181, 131, 98, 82, 521/117, 88, 114

[56] References Cited

U.S. PATENT DOCUMENTS

| | | | |
|---|---|---|---|
| 3,779,959 | 12/1973 | Pinten et al. | 521/181 |
| 4,067,829 | 1/1978 | Garrett | 521/181 |
| 4,233,361 | 11/1980 | Fultz | 521/181 |
| 4,303,758 | 12/1981 | Gusmer | 521/181 |
| 4,530,939 | 7/1985 | Rickle | 521/181 |

*Primary Examiner*—Morton Foelak
*Attorney, Agent, or Firm*—Brooks Haidt Haffner & Delahunty

[57] ABSTRACT

This invention relates to a process for producing phenolformaldehyde foams, also known as phenolic foams, of improved properties. The inventive feature resides in using a controlled combination of the various components in the curing reaction mixture and in controlling the temperature within the mass of the curing mixture. The process is applicable to production of block or laminated foams. Phenolic foams find increasing use in building applications where their thermal insulation and fire resistant properties are of value.

14 Claims, No Drawings

PROCESS FOR PRODUCING PHENOLIC FOAMS

This invention relates to a process for producing phenol-formaldehyde foams, hereafter referred to as phenolic foams and more particularly to phenolic foams of improved properties.

Phenolic foams are finding increasing use in building applications where their thermal insulation and fire resistant properties are of value. The preparation of such phenolic foams has been previously described and involves mixing a phenol formaldehyde resin of the type known in the art as a resole with a blowing agent, a cell stabiliser and a hardener which is typically a mineral or strong organic acid. The mixed ingredients are usually poured into a mould which is then placed in a warm oven to form, cure and set. Alternatively, the mixed ingredients can be converted to cured foam in a continuous process, for example, by depositing the mixed ingredients onto a moving belt.

Cell stabilisers are also referred to in the art as surfactants or cell stabilising surfactants. For convenience the term cell stabiliser will be used in the present specification.

Cell stabilisers have been previously proposed in U.K. Pat. Nos. 1,537,947; 1,062,850 and 1,274,148 and have included ethoxylated derivatives of castor oil, typically prepared by reacting 40 molecules of ethylene oxide with one molecule of castor oil. Siloxane oxyalkylene copolymers have also been proposed in French Pat. No. 2,354,361.

It is an object of the present invention to provide a process for producing either block or laminated phenolic foams of improved properties, for example, water absorption, moisture vapour transmission, thermal conductivity and closed cell content.

Accordingly, the present invention comprises a process for the production of phenolic foams by curing a phenolic resin with a blowing agent, a hardener, a cell stabilizer and a solvent compatible with the resin, characterised in that in the curing mixture
(a) the phenolic resin has a formaldehyde to phenol mole ratio from 1:1 to 2.5:1 and in combination with any of the solvent inherently present therein has a viscosity of 500–10000 centistokes at 25° C.,
(b) the blowing agent is a halogenated hydrocarbon,
(c) the hardener is a mineral acid,
(d) the cell stabilizer is derived by oxyalkylating castor oil or a hydrogenated derivative thereof with ethylene oxide or mixtures thereof with propylene oxide and/or butylene oxide,
(e) the total compatible solvents content of the reaction mixture inclusive of that present in the resin is from 7–30% by weight of which at least 40% by weight is water, and
(f) the temperature within the mass of the curing resin mixture does not exceed 85° C.

The phenol formaldehyde resins also known as 'resoles' can be prepared by condensing 1 mole of phenol with 1 to 2.5 moles of formaldehyde using a base catalyst, e.g. sodium hydroxide. The resoles are preferably prepared by condensing 1 mole of phenol with 1.4 to 2.1 moles of formaldehyde.

For the purposes of the present invention it will be understood by those skilled in the art that phenolic resins of relatively higher viscosity may be used as starting materials provided that the total compatible solvent content of the curing reaction mixture is maintained within the specified range. It is however convenient to use a phenolic resin which inherently contains a compatible solvent and has a viscosity of 1000–10000 centistokes.

The phenolic resin (resole) used suitably has a viscosity of 1000 to 8000 centistokes, preferably 1000–5000 centistokes at 25° C. due to the solvent present therein. The solvent in the resin is suitably a polar solvent and may be water. The water or solvent content of the resin may be from 8-27% by weight, typically from 10 to 22% by weight although some or all of the water content may be replaced by other solvents compatible with the resin. For instance, if the resin has a water content of 20% by weight up to 50% of this water content may be replaced by other compatible solvents. Examples of such compatible solvents include aliphatic or alicyclic hydroxy compounds and esters thereof. Specificaly the hydroxy compounds may be selected from ethylene glycol, propylene glycol, diethylene glycol and dipropylene glycol, and the ester is suitably that derived from mono, di or polycarboxylic acids and may be a phthalate ester such as the dimethyl phthalates e.g. isophthalates.

The blowing agent is preferably a halogenated methane or ethane for example trichloro trifluoro ethane (sold under the trade mark of Freon 113), or trichlorofluoro methane (Freon 11), and these blowing agents give products of lower thermal conductivity than those obtained using hydrocarbon blowing agents such as pentane. The thermal conductivity value of a given foam is represented by 'k' and is measured according to BS 4370, part 2 at 10° C. Foams prepared using the present process have 'k' values of less than 0.020 W/m°C. Thus, the lower the 'k' value of the foam the better its thermal insulation.

The hardener is suitably an aqueous mineral acid, preferably aqueous sulphuric acid, most preferably an aqueous solution containing 50–75% by weight of sulphuric acid. The total compatible solvent content of the reaction mixture inclusive e.g. of the water or other solvents present in the phenolic resin and the water present in the aqueous hardener used is from 7 to 30% by weight, preferably from 10–27% by weight. Of the total solvent at least 40% by weight is water, preferably at least 50% by weight is water.

Castor oil is a glyceride in which the glycerol is esterified predominantly with ricinoleic acid. The cell stabilizer is prepared from castor oil as such or from a hydrogenated derivative thereof. The hydrogenated derivatives may be either fully or partially hydrogenated with respect to the unsaturation in the ricinoleic acid moiety in castor oil. Thus, castor oil or its hydrogenated derivative can be oxyalkylated with ethylene oxide or mixtures thereof with propylene oxide and/or butylene oxide. Where a mixture of propylene oxide and ethylene oxide is used the oxyalkylated product suitably contains up to 60 propylene oxide units and up to 100 ethylene oxide units to form the cell stabilizer. The cell stabiliser preferably contains up to 40 propylene oxide units and from 20 to 60 ethylene oxide units. The oxyalkylene units can be random or arranged in blocks, the former being preferred.

The foaming and curing reaction is exothermic and the resin and the hardener are chosen depending upon the nature of the final end product. It is essential that the temperature within the mass of the curing resin mixture does not exceed 85° C., is suitably between 55° C. and 85° C., and is preferably from 65° to 75° C. For a given foam density, the rate at which heat is dissipated from the foam to the surroundings during the curing reaction will depend upon the surface to volume ratio of the foam. Larger surface to volume ratios result in increased rates of dissipation of heat. Consequently, the combination of resin and hardener chosen for a curing reaction will depend upon the surface to volume ratio of the desired foam. Thus for producing a thin laminate, which has a large surface area and hence a faster rate of heat dissipation, a resin-hardener combination may be chosen which is relatively more exothermic than the combination chosen for a thick block of foam.

According to a further embodiment, the present invention comprises a process for the production of block phenolic foams by curing a phenolic resin with a blowing agent, a hardener, a cell stabilizer and a solvent compatible with the resin in the reaction mixture, characterised in that in the curing mixture (a) the phenolic resin has a formaldehyde to phenol mole ratio from 1:1 to 2.5:1 and in combination with any of the solvent inherently present therein has a viscosity of 500–10,000 centistokes at 25° C., (b) the blowing agent is a halogenated hydrocarbon, (c) the hardener is a mineral acid, (d) the cell stabilizer is derived by oxyalkylating castor oil or a hydrogenated derivative thereof with ethylene oxide or mixtures thereof with propylene oxide and/or butylene oxide, (e) the total compatible solvents content of the reaction mixture inclusive of that present in the resin is from 20–30% by weight of which at least 75% by weight is water, and (f) the temperature within the mass of the curing resin mixture does not exceed 85° C.

In the case of producing block foams, the solvent in the resin is suitably water and the water content of the resin is from 20–30% by weight, typically from 24 to 28% by weight. In this case, if the water content is 24% by weight up to 25% of this amount of water may be replaced by other solvents compatible with the resin as defined above.

The process of the present invention enables closed cell foams with the following properties to be produced:

(i) water absorption values which are less than 6.0% (ISO 2896, 50 mm cube, 7 day immersion, %v/v)

(ii) moisture vapour transmission (MVT) less than 15 microgram meter per Newton hour (BS 4372 Part 2), (iii) a stable closed cell content greater than 80% (ASTM D 2856-70) and (reapproved 1976, Procedure C)

(iv) k values less than 0.020 W/m°C. according to BS 4370, part 2 at 10° C.

The mixture, foaming and curing of the ingredients can be carried out by any of the methods currently employed either batchwise or continuously.

The invention is illustrated by the following Examples.

GENERAL PROCEDURE

EXAMPLES 1-3

Block Foam

All quantities are weight for weight unless otherwise stated.

A. Resin Preparation

A phenolic resole was prepared in the conventional way. Aqueous formaldehyde (36.6%) (1.5 moles) was reacted with phenol (1 mole) using as a catalyst sodium hydroxide (1.23% by weight of phenol charged).

The reaction mixture was heated to 60° C. over a 45 minute period and held at 60° C. for 30 minutes. The temperature was carefully increased to 80° C. and held for 30 minutes at 80° C. The temperature was again increased to permit a 45 minute reflux period. Water was then vacuum distilled to give a material with water content of 20%. It was then held at 70° C. to give a material with a viscosity of 3338 centistokes at 25° C. to 100 parts of this material was added 4 parts of diethylene glycol. The resultant resin had a viscosity of 2550 centistokes at 25° C. and a water content of 19.2% by weight. The resultant resin was stored at 10° C. until used.

B. Foam Preparation

In the Examples three different cell stabilisers were employed. The cell stabilisers were prepared by oxyalkylating castor oil with different molar ratios of ethylene oxide and/or propylene oxide.

Cell Stabilisers

| (a) CO + 40 EO | used in Example 1 |
| (b) CO + 40 EO + 10 PO | used in Example 2 |
| (c) CO + 50 EO + 15 PO | used in Example 3 |

The letters CO mean castor oil, EO mean ethylene oxide and PO mean propylene oxide.

Examples 1, 2 and 3 were prepared to the following formulation:

| | Parts by weight |
|---|---|
| Phenol formaldehyde resin | 100 |
| Cell stabiliser | 2 |
| Freon 113 | 10 |
| 50% aqueous sulphuric acid hardener | 8 |

The cell stabiliser was, in each case, mixed with the resin prepared as in Section (A) above and the mixture was prewarmed to a temperature of 30° to 32° C. Then the Freon was added and mixed until a uniform emulsion had formed and followed by aqueous sulphuric acid. The total solvent content of the reaction mixture was 22.5% by weight.

The mixture was poured into a wooden mould preheated to 40° C., allowed to rise, cure and set in an oven at 50° C. for 2 hours. The foam was then removed from the mould and stored for 3 days at ambient temperature before being cut and tested.

| | Foam Properties | | | |
|---|---|---|---|---|
| | Water Absorption | MVT | Closed Cell Content | k value at 10° C. |
| Example 1 | 5.9 | 13 | 82 | 0.0161 |
| Example 2 | 5.2 | 13 | 80 | 0.0170 |
| Example 3 | 5.0 | 12 | 85 | 0.0156 |

The peak temperature reaches by the exothermic reactions were in the range 79°–82° C. The % of closed cells was determined by ASTM D2856-70 (Reapproved 1976, Procedure C). The moisture vapour transmission was determined by the method designated BS4370 Part 2 and is measured in microgram meter/Newton hour.

The water absorption was determined by the method designated LSO 2896 50 mm$^3$, 7 days immersion (% volume/volume).

The present process can advantageously be used to produce foams of low thermal conductivity because of their ability to produce foam with high closed cell content.

The thermal conductivity was determined by the method designated BS4370 Part 2.

EXAMPLE 4

Laminated Foam

C. Resin Preparation

A phenolic resole was prepared in the conventional way. Aqueous formaldehyde (36.6%) (1.5 moles) was reacted with phenol (1 mole) using as a catalyst, sodium hydroxide (1.23% by weight of phenol charged).

The reaction mixture was heated to 60° C. over a 40 minute period and held at 60° C. for 30 minutes. The temperature was carefully increased to 80° C. and held for 30 minutes. The temperature was again increased to permit a 40 minute reflux period. Water was then vacuum distilled to give a material with water content of 10.7%. It was then held at 70° C. to give a material with a viscosity of 7290 centistokes at 25° C. To 100 parts of this resin, monoethylene glycol 15.8 parts was added. The resultant resin had a viscosity of 1380 centistokes at 25° C. and a water content of 9.9%.

D. Foam Preparation

Continuous phenolic foam laminate was prepared using a Beamech phenolic laminator. The ingredients which included the resin prepared in Section (C) above were continuously fed to a mixer and applied to a glass fleece substrate.

| Formulation | Parts by weight |
| --- | --- |
| Phenolic resin (Section C) | 100 |
| Cell stabiliser CO + 50 EO + 15 PO | 1.87 |
| Cell stabiliser CO + 40 EO | 3.75 |
| Freon 113 | 8.1 |
| Freon 11 | 8.1 |
| Aqueous sulphuric acid hardener (57.5%) | 28 |

The letters CO mean castor oil, EO mean ethylene oxide and PO mean propylene oxide.

The foamable composition was applied to a lower facing sheet of glass fleece. The temperature of the metered chemicals were:
Resin feed 24° C.
Freon feed 15° C.
Hardener 15° C.

The temperature of the conveyor-press section was maintained at 45° C. during the run. The temperature of the foam determined immediately exiting the conveyor press was 67° C.

Product samples cut from the laminate were tested unfaced (core samples).

The closed cell content of the foam was 97% (determined to ASTM D.2856-70 (reapproved 1976, procedure C). The k value at 10° C. was 0.015 W/m°C.

We claim:

1. A process for the production of phenolic foams by curing a phenolic resin with a blowing agent, a hardener, a cell stabilizer and a solvent compatible with the resin, characterised in that in the curing mixture
   (a) the phenolic resin has a formaldehyde to phenol mole ratio from 1:1 to 2.5:1 and in combination with any of the solvent inherently present therein has a viscosity of 500–10000 centistokes at 25° C.,
   (b) the blowing agent is a halogenated hydrocarbon,
   (c) the hardener is a mineral acid,
   (d) the cell stabilizer is derived by oxyalkylating castor oil or a hydrogenated derivative thereof with ethylene oxide or mixtures thereof with propylene oxide and/or butylene oxide,
   (e) the total compatible solvents content of the reaction mixture inclusive of that present in the resin is from 7–30% by weight of which at least 40% by weight is water, and
   (f) the temperature within the mass of the curing resin mixture does not exceed 85° C., and obtaining a foam having:
      (i) a stable closed cell content greater than 80%,
      (ii) k values less than 0.02 W/m°C. at 10° C.

2. A process according to claim 1 wherein the phenolic resin used has a viscosity of 1000 to 8000 centistokes at 25° C.

3. A process according to claim 1 or 2 wherein the solvent in the resin is water.

4. A process according to claim 3 wherein the water or solvent content of the resin is from 8–27% by weight.

5. A process according to claim 1 wherein the compatible solvents present in the curing resin mixture is selected from aliphatic or alicyclic hydroxy compounds and esters thereof.

6. A process according to claim 5 wherein the hydroxy compound is selected from ethylene glycol, propylene glycol, diethylene glycol and dipropylene glycol.

7. A process according to claim 1 wherein the hardener is an aqueous mineral acid.

8. A process according to claim 1 wherein the total compatible solvent content of the reaction mixture inclusive of the water or other solvents present in the phenolic resin and the water present in the aqueous hardener used is from 7 to 30% by weight.

9. A process according to claim 1 wherein the cell stabilizer is drived by oxyalkylating castor oil with a mixture of propylene oxide and ethylene oxide such that the oxyalkylated product contains up to 60 propylene oxide units and up to 100 ethylene oxide units.

10. A process according to claim 1 wherein the temperature within the mass of the curing resin mixture is between 55° C. and 85° C.

11. A process for the production of phenolic foams according to claim 1 wherein the foam is a block phenolic foam by curing a phenolic resin with a blowing agent, a hardener, a cell stabilizer and a solvent compatible with the resin in the reaction mixture, characterised in that in the curing mixture
    (a) the phenolic resin has a formaldehyde to phenol mole ratio from 1:1 to 2.5:1 and in combination with any of the solvent inherently present therein has a viscosity of 500–10000 centistokes at 25° C.,
    (b) the blowing agent is a halogenated hydrocarbon,
    (c) the hardener is a mineral acid,
    (d) the cell stabilizer is derived by oxyalkylating castor oil or a hydrogenated derivative thereof with ethylene oxide or mixtures thereof with propylene oxide and/or butylene oxide,
    (e) the total compatible solvents content of the reaction mixture inclusive of that present in the resin is from 20–30% by weight of which at least 75% by weight is water, and
    (f) the temperature within the mass of the curing resin mixture does not exceed 85° C.

12. A process according to claim 11 wherein the solvent in the resin is water and the water content of the resin is from 20–30% by weight.

13. A process according to claim 1, wherein (g) the phenolic foam has a stable closed cell content greater than 80% and
   has k values less than 0.020 W/m°C.
14. A process according to claim 13, wherein in (g), the phenolic foam has a stable closed cell content from 82% to 97%, and
the phenolic foam has a k value from 0.015 to 0.017 W/m°C.

* * * * *

UNITED STATES PATENT AND TRADEMARK OFFICE
CERTIFICATE OF CORRECTION

PATENT NO. : 4,720,510

DATED : January 19, 1988

INVENTOR(S) : GERALD C. MARKS, KENNETH C. THOMAS and PER I. QUIST

It is certified that error appears in the above-identified patent and that said Letters Patent is hereby corrected as shown below:

Col. 4, line 60, change "temperature" to --temperatures--.

Col. 4, line 60, change "reaches" to --reached--.

Claim 9, line 2, change "drived" to --derived--.

Signed and Sealed this

Fifth Day of July, 1988

Attest:

DONALD J. QUIGG

*Attesting Officer*  *Commissioner of Patents and Trademarks*